Nov. 2, 1971      A. H. WIGNALL      3,616,687
APPARATUS FOR INDICATING HORSEPOWER
Filed Oct. 16, 1969      3 Sheets-Sheet 1

INVENTOR
Albert H. Wignall

BY *Mason, Mason & Allbright*
ATTORNEY

Nov. 2, 1971        A. H. WIGNALL        3,616,687
APPARATUS FOR INDICATING HORSEPOWER
Filed Oct. 16, 1969        3 Sheets-Sheet 2

$e(t) = K_4 \, dL/dt$

INVENTOR
Albert H. Wignall

BY *Mason, Mason & Albright*
ATTORNEY

Nov. 2, 1971          A. H. WIGNALL           3,616,687
APPARATUS FOR INDICATING HORSEPOWER
Filed Oct. 16, 1969                3 Sheets-Sheet 3
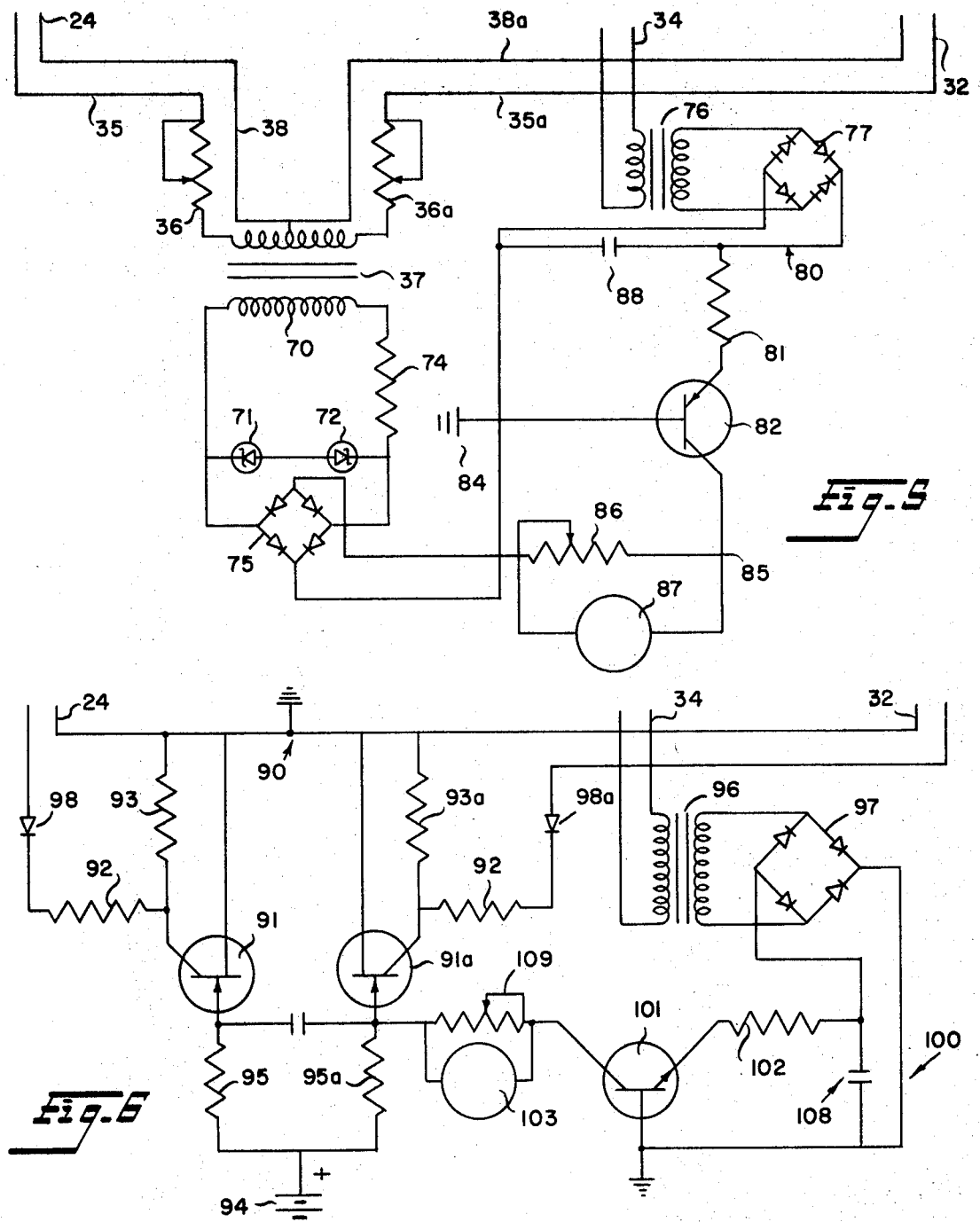
INVENTOR
Albert H. Wignall
BY *Mason, Mason & Albright*
ATTORNEY

United States Patent Office

3,616,687
Patented Nov. 2, 1971

3,616,687
APPARATUS FOR INDICATING HORSEPOWER
Albert H. Wignall, 60 Garrick St., Newark, Ohio 43055
Filed Oct. 16, 1969, Ser. No. 866,842
Int. Cl. G01l 3/00
U.S. Cl. 73—133        5 Claims

ABSTRACT OF THE DISCLOSURE

A horsepower indicator for power levels up to about 2,000 H.P. comprising a pair of spaced gears affixed to the power transmitting shaft; the gears having teeth which are equidistant from root to point and of equal pitch on both sides of each point and of each root whereby they are adapted to generate, in an adjacent magnetic pickup, square shaped alternating electric waves having an ampliude proportional to the speed of the gears involved; said gears having a relative position whereby at zero horsepower the generated waves cancel, but when the shaft twists due to applied torque, the waves are of the same polarity for a time span proportional to the amount of relative shift between the gears. In this relationship, the waves combine to generate negative and positive square wave form pulses which are rectified and passed through a galvanometer which is calibrated for horsepower. A reverse bias is also applied to the current leading to the galvanometer by rectifying further waves generated through a magnetic pickup for one of the gears, filtering same, and applying voltage thereby generated across a resistance in series with the galvanometer; the purpose of the reverse bias being to compensate for errors otherwise introduced by vibration and other variables in the apparatus.

BACKGROUND OF THE INVENTION

The invention pertains to the art of measuring power from a rotating shaft which connects a power source with the load.

A need exists for a device which continuously and directly measures horsepower transmitted through a shaft, which can be applied without undue difficulty on most power transmitting shafts and which is economical to manufacture. The relationship which exists between shaft speed torque and horsepower is: $HP = KRT$ where K is a constant, R is the r.p.m. of the shaft, and T is the torque applied to the shaft. It is also known that the twist of the shaft due to the application of the torque is proportional to the torque. It is suggested in U.S. Pat. 2,947,168 of Aug. 2, 1960, to Dennis C. Yang that spaced magnetic tapes on a shaft can be utilized to generate sine waves which will cancel when there is no torque applied to the shaft and wherein the generated currents will be summed as a shift in the magnetic tapes takes place due to twist of the shaft resulting from applied torque. A problem which may arise from such a system is that if a pure sine wave is not produced by the tape in the magnetic pickup serious inaccuracies in the power reading may result.

Instead of magnetic tapes or the like, gears have been employed with magnetic pickups in devices utilized to measure horsepower by measurement of the phase shift and of the amplitude of the generated signal. However in such cases, the variables have been recorded separately and the horsepower extracted therefrom by manual or computer calculation. A problem incident to the use of gears for the production of electrical signals has been the variability of the signal and the circumstance that such signals have not been considered amenable to mixing for the direct production of a horsepower reading.

An additional problem exists due to undesired variables induced in generated signals as the result of vibrations, teeth irregularities and the like which tend to increase as the speed of the shaft is increased.

Because of the foregoing problems there has not been, at least insofar as applicant is aware, a commercially successful low cost horsepower meter with reasonable accuracy brough forth which measures horsepower directly from the drive shaft between the power shaft and the load.

SUMMARY OF THE INVENTION

The horsepower meter of the invention utilizes spaced gears having a configuration adapted to produce an alternating square wave electrical signal having an amplitude proportional to the speed of the shaft. The waves of spaced gears are combined to produce, when there is a phase shift due to twisting of the shaft, a series of positive and negative pulses having a time span directly proportional to the phase shift. It has been found that when these are rectified a current results which is directly proportional to the shaft horsepower involved. The apparatus is light and mobile and is designed so that it can be fabricated largely from commercially available components. It may be mounted on practically any shaft which transmits power and is susceptible to simple adjustments to insure accuracy.

Other objects, adaptabilities and capabilities will appear as the description progresses, reference being had to the accompanying drawings, in which:

BRIEF DESCRIPTION OF THE DRAWINGS

FIG. 5 is a diagram of a modified circuitry for the invention; and

FIG. 6 is a diagram of a further modification of the circuitry of the system.

DESCRIPTION OF THE PREFERRED EMBODIMENTS

Figure 1:
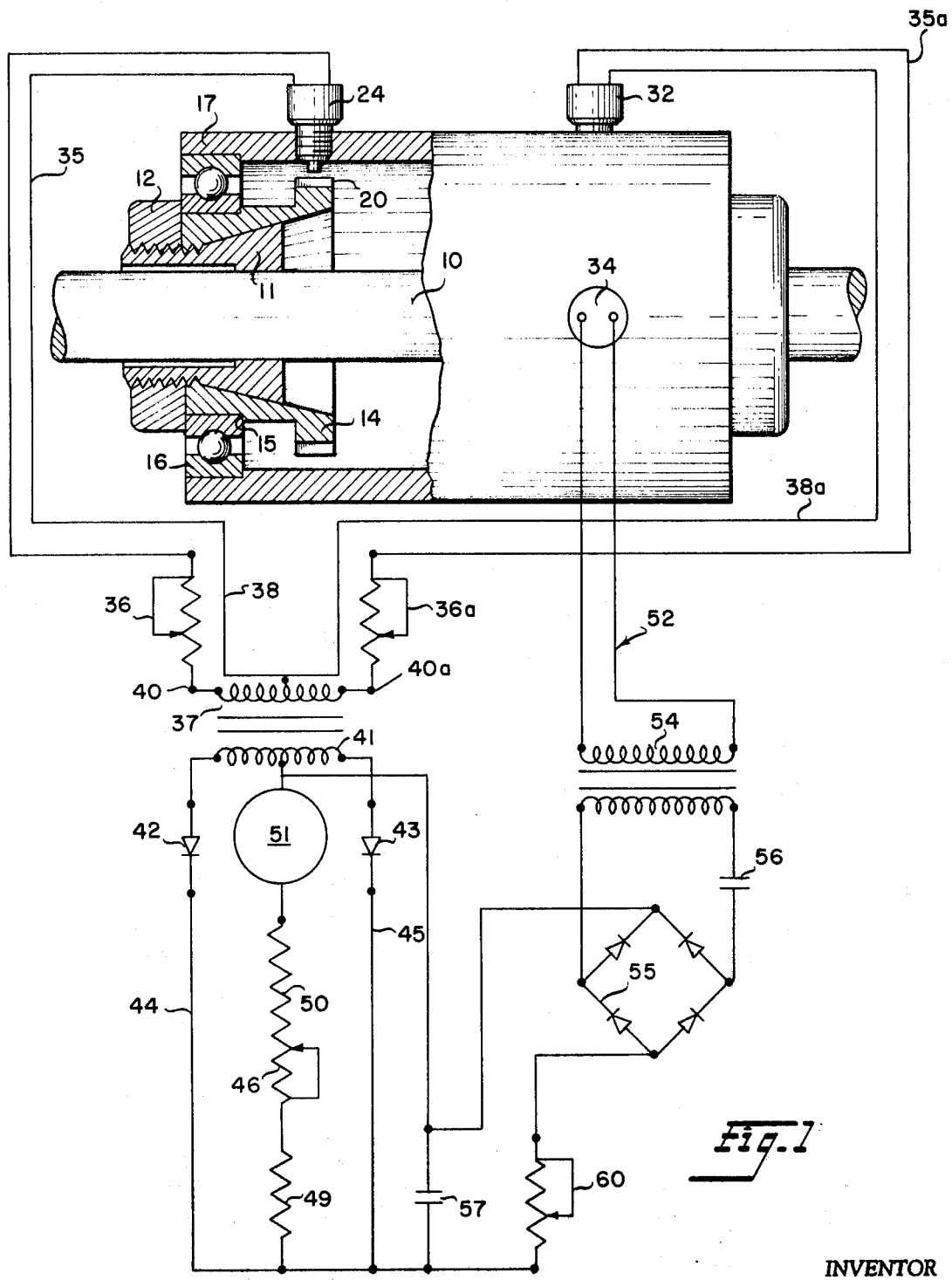
FIG. 1 illustrates a horsepower measuring system embodying the principles of this invention.
Figure 2:
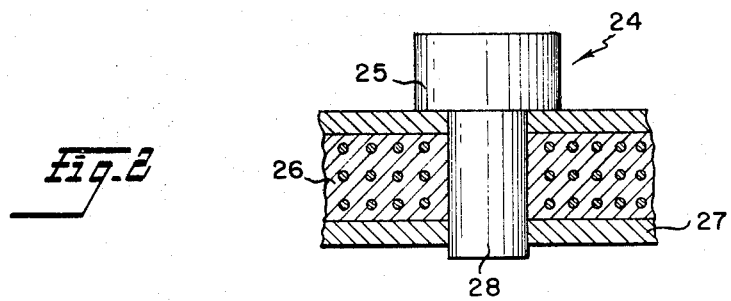
FIG. 2 is a cross-section of a magnetic pickup utilized in the invention.
Figure 3:
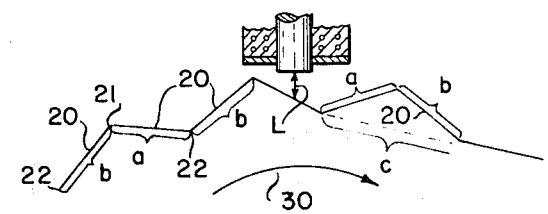
FIG. 3 is a fragmentary side view of the function generating gear and the magnetic pickup and FIG. 3A illustrates the pulses generated thereby.
Figure 3A:
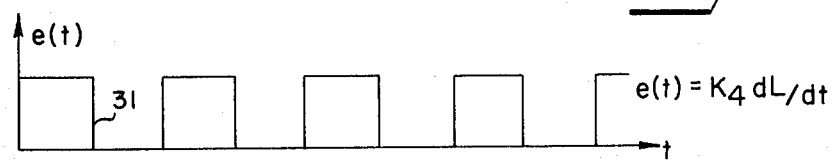

Referring now to FIG. 1, a shaft 10, disposed between a power source and a load, has removably secured thereto a gear mounting sleeve 11 which is threaded on one end and composed of resilient material. If desired, it may be split longitudinally to facilitate a snug connection to the shaft 10. The threaded portion of the sleeve 11 receives a clamping ring nut 12 which clamps a function generating gear 14 against the sleeve 11. The surface of the sleeve 11, after the threaded portion, coincides with the surface of a truncated cone which matches with a similar inner surface of the gear 14 whereby by tightening the nut 12 the gear 14 is forced into a snug fit between sleeve 11 and the nut 12. A shoulder 15 on gear 14, with nut 12, provides a recess which receives a ball bearing 16 which, in turn, supports a cylindrical frame 17. Frame 17 is secured by suitable means, not shown, so as to be stationary, in a relative sense, whereby the shaft 10 together with sleeve 11, nut 12 and gear 14 rotate within frame 17. Disposed about the after periphery of the gear 14 are a plurality of teeth 20 which, as shown in FIG. 3, have a profile whereby the distance $a$ from a point 21 to a root 22 is equal to a distance $b$ on the other side of the tooth from point 21 to a similar root 22. Also, the surfaces of each tooth between each point 21 and root 22 are coplanar. Thus, from the perspective of FIG. 3, if the roots 22 are considered joined by a line c then the triangle formed by c and surfaces a and b is an isosceles triangle.

Frame 17 carries a magnetic pickup 24 of a type known in the art. It comprises a cylindrical permanent magnet 25 with a coil of copper wire 26 which is wound on an insulated spool or bobbin 27 surrounding a smaller diameter pole piece 28 attached to the end of the magnet 25. Magnetic pickup 24 generates an electrical voltage whenever the magnetic field around it is disturbed. The amount of voltage so produced by coil 26 is proportional to the time rate of change of flux sensed by coil 26. The instantaneous value of the voltage produced by the coil 26 may be expressed: $e(t)=K_1 dM/dt$ wherein $e(t)$ is the instantaneous voltage; M is the magnetic flux density and $dM/dt$ constitutes the time rate of the change of flux density; and $K_1$ is a constant which is proportional to the turns in the coil windings 26. The flux density M is, dependent upon the magnetomotive force of the permanent magnet, which is the quantity of the magnetism of the magnet included in the magnetic pickup 24. Flux M, its relationship with magnetomotive force and reluctance is shown by the following equation: $M=K_2/R$ where $K_2$ is a constant to express the magnetomotive force and R is the reluctance. The reluctance in turn is directly proportional to the mean distance L between the pole piece 28 and the teeth 20 and is inversely proportional to the surface area of the pole piece 28 and the adjacent gear tooth 20. The foregoing surface area may be held constant whereas the length of the gap between the pole piece 28 and the tooth 20 may be varied to produce a desired signal voltage output. This may be expressed $R=L/A$ wherein L is the length of the air gap and A is the effective surface area. If then $K_3$ is $1/A$ then: $dR=K_3 dL$. Thus considering $K_4$ to represent a constant $K_2/K_3$ then the change of flux can be expressed:

$$dM = K_4 d\frac{(1)}{L}$$

If the derivative of M is taken with respect to time, the signal voltage generated in the pickup is derived:

$$e(t) = \frac{dM}{dT} = K d\frac{\frac{(1)}{L}}{dT}$$

From the foregoing it will be appreciated that the voltage generated in the coil winding 26 is a direct function of two, variables: to wit; the length of the flux gap and time.

A desired function may be obtained by the shaping of the gear teeth. In this application, the desired function is a square wave. Signal voltage is generated in a magnetic pickup 24, as illustrated in FIG. 3, by the time rate of change which takes place in the air gap having a mean dimension L. Rotation of the gear 14 past magnetic pickup 24 in a direction of rotation indicated by the arrow 30 produces a series of rectangular pulses 31 of a type illustrated on the graph 3A wherein the vertical component is $e(t)$ and the horizontal component is $t$. Thus $$e(t) = K_4 \frac{dL}{dt}$$

It will be appreciated that the triangular teeth present positive and negative straight line slopes. Since the voltage $e(t)$ was derived to be a function of $dL/dt$ and the rate of change of L is linear, then $dL/dt$ has a rectangular form of positive values for the positive slopes and negative values for the negative slopes.

In FIG. 1, the right side of the apparatus is not shown in section since it is identical with the left side which is shown except, of course, that the parts are reversed. However, in addition to a magnetic pickup 32 which serves the same purpose and is identical with magnetic pickup 24, there is a further magnetic pickup 34 which serves a purpose which will be hereinafter described. Both of the pickups 32 and 34 are disposed over a gear identical to gear 14.

Figure 4A:
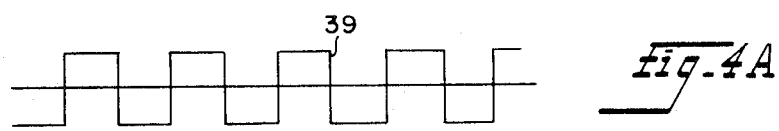
FIGS. 4A, 4B and 4C depict the waves generated by two of the magnetic pickups before and after being combined.
Figure 4B:
Figure 4C:
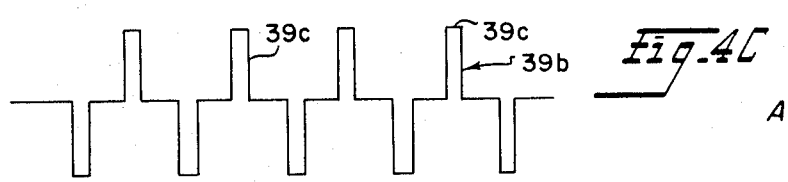

A voltage signal generated in the magnetic pickup 24 enters a circuit 35 wherein it passes through a variable resistance or potentiometer 36 and to a transformer 37. A further circuit 38 connects the other end of the magnetic coil 26 of magnetic pickup 24 with the center tap of the transformer 37 to provide (with circuit 35) a continuous circuit. At connection 40, between the potentiometer 36 and the transformer 37, the electrical signal 39 generated from magnetic pickup 24 by gear 14 revolving at a constant speed thereunder is shown in FIG. 4A. The circuit leading to and from the coil in magnetic pickup 32 is identical to that shown with respect to magnetic pickup 24 except that it connects in the other side of the transformer 37. Thus a circuit 35a leads from pickup 32 through a potentiometer 36a, through a connection 40a to the transformer 37, and finally returns through the center tap of transformer 37 via the circuit 38a; the suffix "a" being used with the reference numeral in each case to designate a similar part. The gears 14 underlying the magnetic pickups 24 and 32 are adjusted so that with the shaft turning under no load conditions the signals generated by the magnetic pickups 24 and 32 effectively cancel each other. However, when a load is applied on the shaft 10 and torque is thereby produced which causes the shaft to twist, a displacement occurs between the relative positions of the gears 14 so that instead of cancelling, the signals for the magnetic pickups will be added for durations each cycle relative to the amount of twist. For example, say under about one-third load conditions, the signal 39 for magnetic pickup 24 taken from connection 40, as shown in FIG. 4A, is displaced from a signal 39a taken from magnetic pickup 32 (as shown in connection 40a) which is depicted in FIG. 4B. Such displacement is reflected in the signal generated by the transformer 37 which is represented by the pulsed signal 39b shown in FIG. 4C. It will be appreciated that the amplitude of each of the pulses 39c is proportional to the speed of the gear 14 and thus that of the shaft 10 and that the time span of each pulse is proportional to the offset between the spaced gears 14 under magnetic pickups 24 and 32 respectively. This, in turn, is proportional to the degree of twist in the shaft 10 which is a function of the power transmitted by the shaft.

The voltage is increased in the secondary 41 of transformer 37 by a factor of about 20 to 1 and current therefrom is rectified by a pair of diodes 42 and 43 which are incorporated in circuits 44 and 45, respectively, on each side of the secondary 41. If desired, condenser filters (not shown) may be incorporated in the circuits 44 and 45 for the purpose of smoothing out the current, that is transforming the pulse current to a continuous current following the diodes. The desirability of such filters depends upon the type of meter or read-out device which is used for the signal. In a disclosure, the pulse current is received in a further circuit 46 wherein it first passes through a resistor 49, then a variable resistor of potentiometer 50 and finally into meter 51. Meter 51 is a galvanometer calibrated to display horsepower. It will thus be understood that the resistor 49 and potentiometer 50 are utilized to scale the horsepower signal from the secondary 41 so that the proper value of horsepower is displayed upon the face of the meter 51. In practice, the resistor 49 and potentiometer 50 have a total resistance of about 1–4 megaohms depending upon the application. A galvanometer movement found practical is a taut band 0–5 microamp type for the measurement of current. However, other type meters may be utilized within the skill of the art.

The current to the meter 51 receives a reverse bias from voltage, applied across the resistor 49 and 50, initially generated from magnetic pickup 34 for the purpose of eliminating errors from the signal to the meter 51 which might be induced by vibration or other variables in the operating apparatus. This circuit designated generally 52 includes a transformer 54 for coupling purposes. Direct current is produced by means of bridge rectifier 55 which includes a blocking capacitor 56; the current being filtered by a filter capacitor 57. A potentiometer 60 of 10 kilohms is utilized to adjust the error signal to be equal and opposite to error signal seen at meter 51 for the circuit.

It is not necessary but desirable that both resistor 36 and 36*a* be variable for tuning the device, particularly when the circuit for reading the horsepower is remote from the pickups and the transducer assembly.

In operation, the assembly as shown in FIG. 1 is secured to a shaft and gears 14 are carefully aligned. Each of the gears 14 is identical with the number of teeth depending upon the basic shaft twist characteristics. Basically, the number of teeth involved is such that under full load conditions, the shaft twist provides a phase shift of the teeth of almost 100 percent. The motor is operated under various load conditions and variances in shaft twist are compensated through the various means available. A certain amount of compensation is possible through the use of the potentiometers 36 and 36*a*. There may also be several scales on the meter 51. In addition, the distance between gears 14 may be varied by selecting a frame 17 with a different overall length. The reading of the horsepower meter is also affected by adjustments of the potentiometer 50 as well as the potentiometer 60 which is for the purpose of eliminating unwanted signals. However, once properly adjusted, the assembly gives an accurate and continuous reading of the shaft horsepower.

Referring now to the modified circuit shown in FIG. 5 it will be noted that the circuit up to transformer 37 is identical to that shown in FIG. 1 and the same reference numerals have been employed. However the secondary, designated in this modification, 70 of transformer 37 conveys positive and negative pulses of the type shown in FIG. 4C to a zener clipper circuit which includes two zener diodes 71 and 72 which are back to back in parallel with the secondary 70. A resistor 74 which is disposed between the connection of one of the zener diodes 72 and the secondary 70 has a value so that the secondary voltage divides more or less evenly between the secondary 70 and the zener diodes 71 and 72 at nominal input. The zener diodes 71 and 72 are chosen to operate at a predetermined voltage which defines the minimum speed of shaft rotation at which significant horsepower readings are expected. Since the zener clipper circuit effectively clips the amplitude of the pulses generated in the secondary 70 above the aforesaid predetermined voltage, the signals across the bridge rectifier 75 are pulses of a constant amplitude which, however, have a time span proportional to the torque applied to the shaft as indicated by the relative displacement of the teeth 20 in spaced gears 14. A further signal proportional to the amplitude is taken from the magnetic pickup 34 in this embodiment which is stepped up through transformer 76 and rectified through a full wave bridge rectifier 77. Current from the rectifier 77 enters into a circuit designated generally 80 which includes a resistance 81 that connects to the emitter of a P-N-P transistor 82 which is grounded through its base at 84. Capacitor 88 is used as a filter. The collector of transistor 82 connects at 85 to the zener clipper circuit via a resistor 86. By this means the amplitude of the pulse emitted from the zener clipper circuit is modulated, that is in effect multipled, by means of the transistor 82 by an amount proportional to the speed signal transmitted from the rectifier 77 to the emitter of transistor 82. Accordingly, the pulse signal received by the meter 87 has a strength which is proportional to both the speed signal from rectifier 77 and the torque signal across the resistance 75. With the horsepower meter 87 calibrated correctly, the instaneous shaft horsepower of shaft 10 is registered thereon.

In FIG. 6, again a multipled circuit has been shown which connects to the magnetic pickups 24, 32 and 34 as shown in FIG. 1. A circuit for generating the torque signal designated generally 90 includes a pair of silicon controlled rectifiers (SCR's) 91 and 91*a*. The pulse current from the magnetic pickups 24 and 32 (which is of a type shown in 4C) is rectified by diodes 98 and 98*a* to provide positive pulses and is biased across the SCR's 91 and 91*a* by means of resistors 92, 93, 92*a* and 93*a*. A battery 94 has its positive side connected to the SCR's 91 and 91*a* via biasing resistors 95 and 95*a*. It will be understood that the SCR's 91 and 91*a* alternately switch pulses through resistors 95 and 95*a*, the pulses having a time span, proportional to the torque of shaft 10. The speed signal, taken from the magnetic pickup 34 is introduced into a step-up transformer 96 and through a full wave bridge rectifier 97. From the rectifier 97 the current enters into a circuit designated generally 10. Capacitor 108 is used as a filter. Current is fed to the positive emitter connection of the N-P-N transistor 101 via resistance 102. Transistor 101 modulates the pulse received via the SCR's 91 and 91*a* from circuit 90 whereby the pulses entering the meter 103 have been modulated by transistor 101 in proportion to the current from magnetic pickup 34 and, accordingly, the modulation is proportional to the speed of the shaft 10. Since the time span of each pulse entering the meter 103 is proportional to the torque of shaft 10 it will be understood that the pulses received by the meter 103 are proportional both to torque and to the speed of shaft 10. Thus, properly calibrated, the meter 103 displays the instantaneous shaft horsepower as revealed at the shaft. Calibration of the meter 103, per se, is accomplished by potentiometer 109.

Having thus described my invention, what I claim as new and desire to secure by Letters Patent of the United States is:

1. Apparatus for providing direct and continuous reading of power transmitted by a rotating shaft which comprises:
   a frame member (17) around said shaft and secured relative thereto whereby said shaft rotates within said frame member;
   a pair of gears (14) having an equal number of teeth (20), each of said gears secured to said shaft for rotation therewith in fixed spaced relation from each other;
   a pair of magnetic pickup coils (24, 32) each disposed adjacent one of said gears;
   the teeth of each of said gears adapted to generate in said coils a square wave alternating signal as they are rotated thereunder, said signal having an amplitude proportional to the speed of rotation of said shaft and a width proportional to the torque on said shaft;
   means to rectify said signal;
   means to indicate the average or integrated value of said signal as a measure of horsepower;
   and a circuit (38, 38*a*) interconnecting said coils and said indication means.

2. Apparatus in accordance with claim 1 wherein each of said coils is disposed relative to the teeth of its corresponding gear whereby said signals substantially cancel each other when said shaft is rotated under no load conditions.

3. Apparatus in accordance with claim 2 wherein when said shaft is transmitting significant power, said gears are shifted relative to each other due to torque twisting said shaft by an amount proportional to the applied torque and the combined signals from said coils produce rectilinear pulses having a time span proportional to said torque.

4. Apparatus in accordance with claim 3 wherein a further magnetic pick-up coil is disposed on said frame member relative to one of said gears whereby current is generated in said further coil which is rectified and connected into said circuit to produce a reverse bias which compensates for errors introduced by vibrations, tooth irregularities and the like.

5. Apparatus in accordance with claim 1 wherein each of said teeth, seen in elevation, has two equidistant edges from the roots to the point thereof, said edges together with a line through said roots conforming to an isosceles triangle.

References Cited
UNITED STATES PATENTS

| | | | |
|---|---|---|---|
| 2,949,029 | 8/1960 | Bayles et al. | 73—136 |
| 2,957,094 | 10/1960 | Buechner | 310—111 |
| 3,170,323 | 2/1965 | Kuhrt et al. | 73—136 |
| 3,194,065 | 7/1965 | Wilson | 73—136 |
| 3,230,407 | 1/1966 | Marsh | 310—168 |
| 3,251,223 | 5/1966 | Barg | 73—136 |
| 3,258,961 | 7/1966 | Van Manen | 73—136 |

RICHARD C. QUEISSER, Primary Examiner

J. WHALEN, Assistant Examiner

U.S. Cl. X.R.

73—136 A; 324—68